United States Patent [19]

Safinya

[11] Patent Number: 4,652,829

[45] Date of Patent: Mar. 24, 1987

[54] ELECTROMAGNETIC LOGGING APPARATUS WITH BUTTON ANTENNAS FOR MEASURING THE DIELECTRIC CONSTANT OF FORMATION SURROUNDING A BOREHOLE

[75] Inventor: Kambiz A. Safinya, Ridgefield, Conn.

[73] Assignee: Schlumberger Technology Corp., New York, N.Y.

[21] Appl. No.: 687,072

[22] Filed: Dec. 28, 1984

[51] Int. Cl.⁴ .............................................. G01V 3/30
[52] U.S. Cl. ..................................... 324/338; 324/341; 324/347
[58] Field of Search ............... 324/338, 339, 341, 343, 324/347, 333, 344; 343/769, 789

[56] References Cited

U.S. PATENT DOCUMENTS

| | | | |
|---|---|---|---|
| 2,945,232 | 7/1960 | Jasik | 343/769 X |
| 2,947,987 | 8/1960 | Dodington | 343/769 X |
| 3,568,206 | 3/1971 | Sisson et al. | |
| 3,665,480 | 5/1972 | Fassett | 343/769 X |
| 3,849,721 | 11/1974 | Calvert | 324/338 |
| 3,944,910 | 3/1976 | Rau | 324/338 |
| 4,511,842 | 4/1985 | Moran et al. | 324/338 |
| 4,575,728 | 3/1986 | Theobald et al. | |
| 4,578,645 | 3/1986 | Hoehn | |
| 4,581,584 | 4/1986 | Baldwin | |
| 4,590,480 | 5/1986 | Nikolayuk et al. | |

FOREIGN PATENT DOCUMENTS

| | | | |
|---|---|---|---|
| 1040261 | 10/1978 | Canada | 324/341 |
| 2146126 | 4/1985 | United Kingdom | |

OTHER PUBLICATIONS

Freedman et al., "Theory of Microwave Dielectric Constant Logging Using the Electromagnetic Wave Propagation Method", Geophysics, vol. 44, No. 5, 5/1979, pp. 969-986.

Primary Examiner—Reinhard J. Eisenzopf
Assistant Examiner—Warren S. Edmonds
Attorney, Agent, or Firm—Stephen Borst; Peter Lee; Martin Novack

[57] ABSTRACT

An electromagnetic logging apparatus is disclosed which employs dielectric-filled button antennas, in conjunction with tuning elements, to obtain improved operation. The apparatus can be used to measure the dielectric constant of formations surrounding a borehole.

13 Claims, 5 Drawing Figures

ELECTROMAGNETIC LOGGING APPARATUS WITH BUTTON ANTENNAS FOR MEASURING THE DIELECTRIC CONSTANT OF FORMATION SURROUNDING A BOREHOLE

BACKGROUND OF THE INVENTION

This invention relates to well logging and, more particularly, to an apparatus for well logging with electromagnetic energy.

The measurement of dielectric constant (or electric permittivity) of formations surrounding a borehole is known to provide very useful information about the formations. The dielectric constant of the different materials of earth formations vary widely (for example, 2.2 for oil, 7.5 limestone, and 80 for water), so measurement of dielectric properties is a useful means of formation evaluation. As an illustration, if the lithology and the water saturation of a particular formation are determined from conventional well logging techniques, or are otherwise known, it is recognized that the porosity should be determinable if the dielectric constant of the formation could be obtained. Similarly, if the lithology and porosity were given as knowns, information as to the degree of water saturation should be obtainable by measuring the dielectric constant of the formation.

A logging device which improved the art of measuring formation dielectric constant was the electromagnetic propagation tool as disclosed, for example, in the U.S. Pat. No. 3,944,910. As described in the referenced patent, that logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations can then be obtained from the phase and attenuation measurements. Measurements are typically, although not necessarily, made on the formation invaded zone. The configuration of the antennas is an important aspect of successful operation of the described type of logging device. At the relatively high frequency of operation (for example 1100 MHz.) the signal attenuates quite rapidly, so it is important to have transmitting antennas which efficiently generate energy and inject it into the formations, and to have receiving antennas which efficiently receive energy which has propagated through the formations. Since the accuracy of the dielectric constant and conductivity measurements depends upon accurate measurements of attenuation and phase of the received signals, it is essential that the antennas operate in a stable manner over time and that the antennas are in, and remain in, a substantially balanced condition. Further, spurious signal components and the deleterious effects of fringing fields should be minimized.

In the abovereferenced U.S. Pat. No. 3,944,910 the antennas described in the electromagnetic propagation logging device are cavity-backed slot antennas which are filled with a dielectric material and include a probe which is an extension of the center conductor of the coaxial feed to a transmitting antenna (or from a receiving antenna, as the case may be) which extends across the cavity-backed slot and has a free end which terminates within a dielectricfilled recess in a side of the cavity-backed slot. Each antenna extends a cavity depth of a quarter wavelength into its metal housing. The length of the cavity-backed slot is a half wavelength.

The described type of cavity-backed slot antenna is inherently tuned at the operating frequency due to its cavity structure. At the relatively low signal levels involved, this tuning helps provide efficient (operation at the selected) frequency for obtainment of a reasonable signal-to-noise ratio. Some disadvantages are present, however, in the structure and operation of the described type of logging device. The dimensions of the cavity-backed slot are a sizeable fraction of a wavelength. As a consequence of the relatively large size, the phase-center of the slot is not well defined and, also, the slot opening can tend to interact substantially with electromagnetic waves propagating near the opening. The cavity-backed slot is inherently narrow band, and this limits the possibility of varying the operating frequency. The drilling borehole is a very difficult operating environment, and the logging device is subjected to a range of pressures, temperatures, and mechanical stresses. Applicant has noted that the incursion of fluid into the dielectric material can be a substantial cause of operating problems in the types of logging devices described above. The dielectric material exposed to the borehole environment can suffer the incursion of water. Water can enter through cracks in the dielectric material (the possibility of such cracks being increased by the hostile environment) and, even without cracks, the dielectric materials may have an inherent degree of porosity which is subject to the incursion of fluids. When a fluid (typically water) enters the dielectric material in the cavity-backed slot, the dielectric constant of the "wet" dielectric can increase substantially over its original "dry" value (since water has a much higher dielectric constant than the dielectric material utilized). Since the wavelength of the operating signal within the cavity-backed slot depends on the dielectric constant of the medium containing the wave, the wavelength of the energy will be changed (shortened in this case due to the high dielectric constant of water), and the operation of the cavity-backed slot antenna will degrade as the cavity goes out of resonance.

The incursion of fluid into the dielectric material of the antenna can also cause a problem because of its effect on the material around the free-ended probe in the described structure. In particular, the probe end in the recess of the antenna wall has a certain inherent capacitance, the value of which will be affected by the dielectric constant of the dielectric material. Again, if the dielectric material becomes "wet", the antenna characteristic will be changed.

It is among the objects of the present invention to generally improve operation of electromagnetic logging devices of the type utilized, inter alia, for determination of formation dielectric constant, and further to provide improved and more stable operation in a borehole environment.

SUMMARY OF THE INVENTION

The present invention is directed to an apparatus for investigating formations surrounding a borehole. In accordance with an embodiment of the invention, a logging device is provided, and is moveable through the borehole. A pad member is mounted on the logging device, and is adapted for engagement with the borehole wall. A transmitting antenna is mounted in the wall-engaging face of the member, and pair of spaced receiving antennas are also mounted in the wall-engaging face of the member, in spaced relation to the transmitting antenna. Each of the transmitting and receiving antennas comprises a conductive metal base (which may or may not be common to one or more of the antennas) having a generally cylindrical recess therein which opens toward the borehole wall. A conductive rod is coaxial with the recess and extends into the recess, and a conductive button is mounted at the end of the rod. A dielectric material substantially fills the remainder of the recess. A tuning element, separate from the recess, is coupled to the rod. Means are provided for energizing the transmitting antenna to transmit electromagnetic energy into the formations by applying a signal to the tuning element with respect to the base. Means are also provided for generating an output at each of the receiving antennas representative of the electromagnetic energy received from the formations by obtaining a signal across the tuning element with respect to the base.

In the antennas hereof the average of the circumferences of the recess and the button is less than a wavelength at the operating frequency in the dielectric material of the recess, and the depth of the recess is less than a quarter wavelength at the operating frequency in the dielectric material of the recess. Accordingly, the recess and button do not form a resonant cavity at the operating frequency, and there is substantially less sensitivity of the antenna characteristics with respect to factors such as changes in the dielectric filler material due to incursion of water. The size of the recess and button is small as compared, for example, to the type of cavity-back slot antennas described in the Background portion hereof. The antennas hereof scatter less energy and have less interaction with any spurious electromagnetic components propagating near the antenna. The dimensions of the recess and button are such that only the TEM mode can exist, and higher order modes are cut off. The smaller dielectric-filled opening tends to be more rugged and less subject to incursion of fluid or other deleterious effects of the hostile borehole environment. Also, since the antennas have broader band characteristics, efficient operation at different frequencies is possible.

In the preferred embodiment of the present invention, a tuning element is provided that is separated from the recess and sealed with respect to the recess, so as to isolate the tuning element from environmental perturbations (such as incursion of water or mechanical perturbations) of the dielectric material in the recess. Accordingly, the antenna's behavior as an electric dipole will not be greatly altered by a change in the properties of the dielectric material filling the recess, and the separate tuning element will increase the efficiency of antenna operation without being substantially subjected to degradation by the hostile environment.

Further features and advantages of the invention will become more readily apparent from the following detailed description when taken in conjunction with accompanying drawings.

DESCRIPTION OF THE PREFERRED EMBODIMENTS

Figure 1:
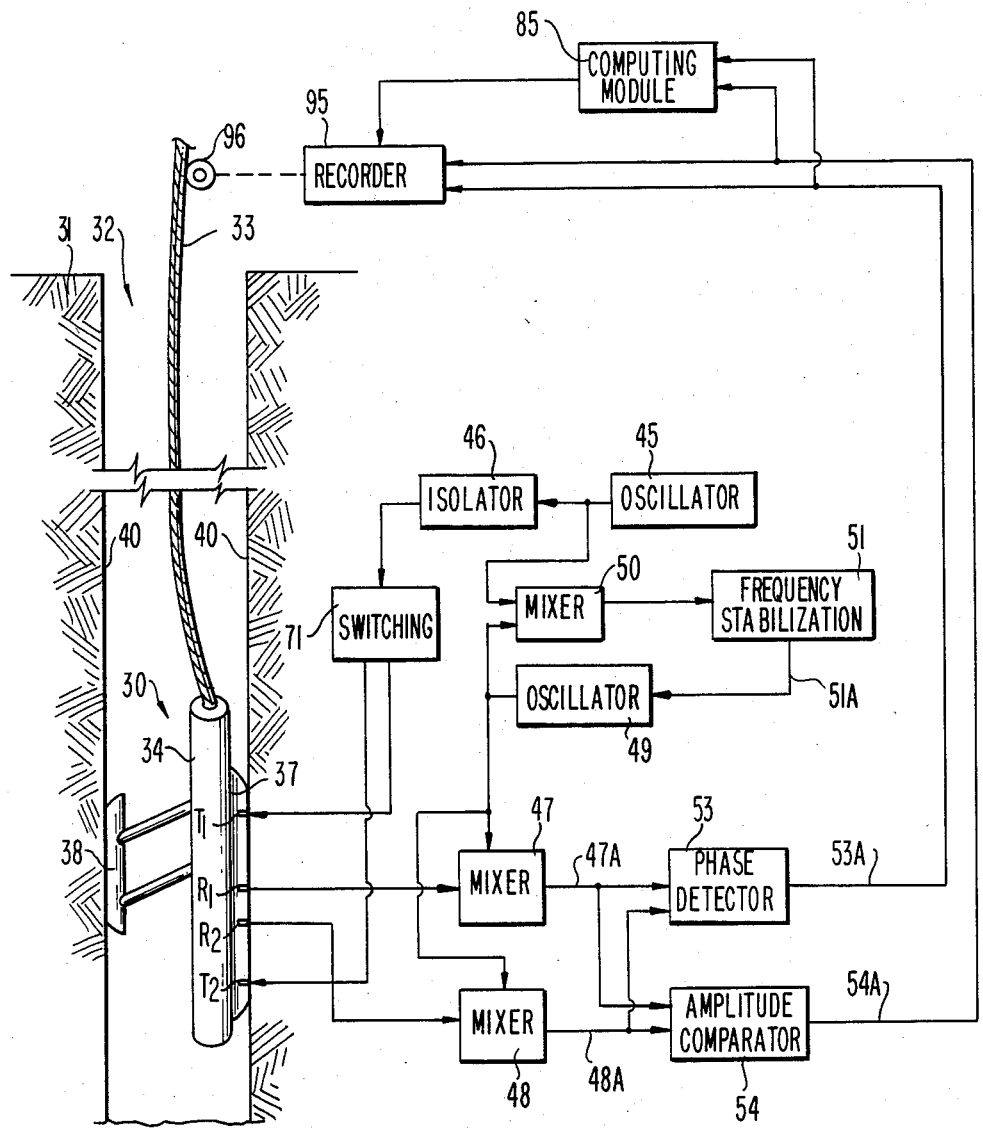
FIG. 1 is a schematic representation, partially in block diagram form, of the type of apparatus which can include the improvements of the invention.

Referring to FIG. 1, there is shown an embodiment of the type of apparatus 10, for investigating subsurface formations 31 traversed by a borehole 32, which includes the improvements of the invention. The borehole 32 is typically filled with a drilling fluid or mud which contains finally divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 is formed on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a fluid-tight housing containing the bulk of the downhole electronics. Mounted on one side of sonde 34 is a pad 37 which contains, inter alia, vertically spaced transmitting antennas T1 and T2, and vertically spaced receiving antennas R1 and R2 between the transmitting antennas. On the other side of sonde 34 is mounted a backup arm 38 which may be hydraulically controlled to maintain the pad 37 in contact with the borehole wall. The backup arm 38 can also be used to provide a caliper reading. Electronic signals indicative of the information obtained by the logging device are transmitted through the cable 33 to a computing module 85 and a recorder 95, typically located at the surface of the earth. The particular means shown in FIG. 1 for maintaining the antennas in engagement with the borehole wall is illustrative, and it will be appreciated that other known suitable means for accomplishing this objective can be utilized.

The downhole electronics contained within the member 34 are shown, for convenience of illustration, at the side of the borehole. An oscillator 45 provides output energy which, in the present invention, is preferably greater than 100 MHz, and, in the example hereof is 1100 MHz. The output of oscillator 45 is coupled through isolator 46 and switching circuit 71 to the transmitting antennas T1 and T2, respectively. As is well known in the art, the transmitters T1 and T2 can be alternately enabled to implement "borehole compensated" operation. In this regard see, for example, U.S. Pat, No. 3,849,721. As described in that patent, the roles of the receivers are also switched as part of the borehole compensation scheme and to compensate for amplifier drift and other processing instabilities. This type switching can also be utilized in the context of the present invention. However, the improvements of the present invention are not, per se, directed to borehole compensation or the referenced switching or processing, so for ease of explanation the receivers R1 and R2 will be respectively considered as the near and far receivers during transmission from transmitter T1, and the case of transmission from transmitter T2 will not be described in detail.

Electromagnetic energy is transmitted from transmitter T1 into the surrounding formations. Energy received at receiving antennas R1 and R2 is respectively coupled to input terminals of mixers 47 and 48. As described, for example, in the U.S. Pat. No. 3,944,910, the signals which arrive from R1 and R2 are out of phase with each other by an amount which depends upon properties of the surrounding formations and have an amplitude ratio which also depends upon properties of the surrounding formations. Secondary input terminals of the mixers are supplied with energy at a frequency that is separated from the transmitter frequency by some relatively low frequency which is typically in the kilohertz frequency range. In the embodiment shown, oscillator 49 supplies electromagnetic energy to mixers 47 and 48 at a frequency that is, for example, 10 KHz. above the transmitter frequency. The output signals 47A and 48A of the mixers 47 and 48 therefore contain the difference frequency of 10 KHz. In accordance with well known principles, the signals 47A and 48A maintain the phase and amplitude relationships of the signals from R1 and R2, but the task of phase detection is greatly facilitated at the lower frequency of the mixed signals. To ensure that the difference frequency between the outputs of the oscillators 45 and 49 remains at 10 KHz., the oscillator outputs are sampled and fed to a mixer 50. The output of the mixer is received by a frequency stabilization circuit 51 which detects drifts from the 10 KHz. standard and generates a correction signal 51A which controls oscillator 49 in the manner of a conventional "phase-locked loop".

The signals 47A and 48A are applied to a phase detector circuit 53 and to an amplitude comparator 54. The output of the phase detector 53 is a signal level which is proportional to the phase difference between the signals received at R2 and R1. The output of amplitude comparator 54 is a signal level which is proportional to the relative amplitude of the signal received at R2 with respect to the signal received at R1. Suitable types of phase and amplitude comparator circuits are known in the art. (Also, see the above-referenced U.S. Pat. No. 3,944,910.)

The outputs of the phase detector circuit 53 and the amplitude comparison circuit 54 are transmitted to the surface over the conductor pair 53A and 54A which in actuality pass through the armored cable 33. These signals may be, for example, D.C. levels which are stepped-up by amplification before transmission to the surface, or may be converted to digital form downhole before transmission to the surface.

At the surface of the earth the signals on lines 53A and 54A are recorded by a recorder 95 that is conventionally driven as a function of borehole depth by mechanical coupling to a rotating wheel 96. The wheel 96 is coupled to the cable 33 and rotates in synchronism therewith so as to move as a function of borehole depth. In addition to recording the attenuation and phase representative signals on recorder 95, these signals may also typically be coupled to a computing module 85. The computing module may include processing means for determining the dielectric constant and/or the conductivity of the invaded zone of the surrounding formations. The recording means may alternately include processing means for determining other parameters of the surrounding formations, as is known in the art. It will be understood that the present invention is directed to improvements in the structure of the logging device, and is not limited by the manner in which detected signals are processed. In this same context it will be recognized that while differential measurements of phase and attenuation are set forth in the described embodiment, absolute measurements of phase and/or amplitude relative to the transmitter may be taken and utilized, if desired. These measurements can also be useful in a determination of mudcake resistivity and thickness.

Figure 2:
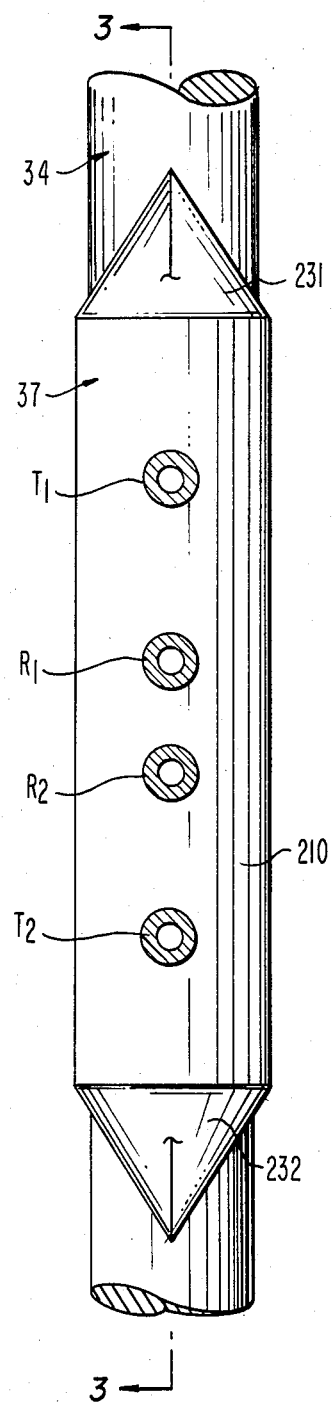
FIG. 2 is a top view of the pad member of logging device of FIG. 1.
Figure 3:
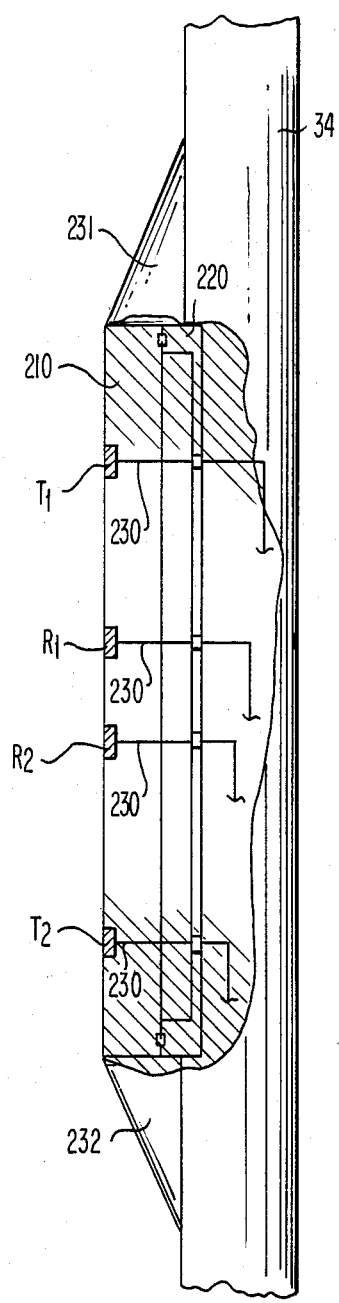
FIG. 3 is a cross-sectional view of the pad member of FIG. 2, as taken through a section defined by the arrows 3—3 of FIG. 2.

FIGS. 2 and 3 illustrate a form of the pad 37 in accordance with an embodiment of the invention. The pad is mounted in an opening in the sonde 34, and includes a metal base 210 in which the antennas T1, R1, R2, and T2 are formed. In the present embodiment, the base 210 comprises four metal sections secured to a frame 220 under the base. The frame 220 includes openings through which the coaxial lines pass to and from the sonde 34, where they are coupled to the circuitry such as is represented in FIG. 1. Metal end ploughs 231 and 232 are utilized to cut through the mudcake and facilitate movement of the pad along the borehole wall.

Figure 4:
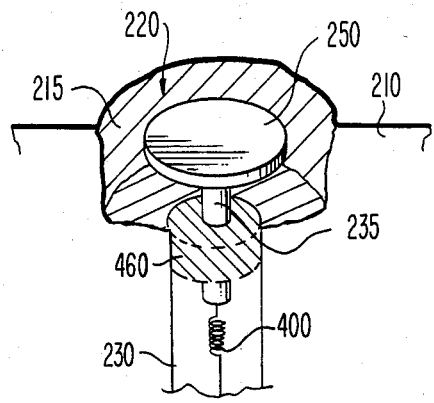
FIG. 4 is a perspective view, partially broken away, of an antenna in accordance with an embodiment of the invention.
Figure 5:
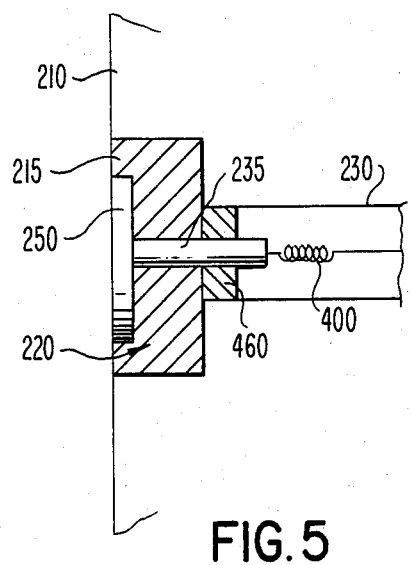
FIG. 5 is a cross-sectional view of the antenna of FIG. 4, as taken through a section defined by arrows 5—5 of FIG. 4.

The button antennas utilized as the transmitting and receiving antennas are shown in greater detail in FIGS. 4 and 5. In the present embodiment a cylindrical recess 220 is formed in the conductive metal base 210, and the bottom of the recess communicates with a coaxial cable 230, the outer conductor of which is coincident with, or coupled to, the metal base 210. The central conductor of the coaxial cable 230 is coupled, via inductor 400, to a conductive rod 235 which extends into the recess 220 and has conductive metal button 250 formed at an end thereof. As defiend herein, the button is a generally rounded protrusion at the end of a conductive wire or rod. In the present embodiment the button is a circular disc having a top surface which can be curved, if desired, to confirm to the curvature of pad 37. The region of recess 220 is filled with a dielectric material 215 having a dielectric constant of, for example, about 5.

The average of the circumference of recess 220 and the circumference of the button 250 is less than a wavelength at the operating frequency in the dielectric material, and the depth of the recess is less than a quarter wavelength at the operating frequency in the dielectric material. Accordingly, there will be no standing waves in the recess. The dimensions of the recess and button are such that only the TEM mode can exist, and higher order modes are cut off.

The rod 235 passes through an insulating ceramic pressure seal 460, and is coupled to one end of the tuning element 400 which, in the present embodiment, is represented by an inductor. The seal 460 serves to isolate the tuning element from the recess environment, to prevent any incursion of water or other substance, or from mechanical pertubations which might change or degrade the characteristics of the tuning element. The button antenna hereof acts as an electric dipole oriented perpendicular to the plane of the pad member. Since the button structure behaves essentially capacitively, the tuning element is substantially inductive, although it will be understood that some capacitive tuning can be employed to tune parasitic inductance. The tuning element 400 may be a lumped inductor, appropriate section of transmission line or other suitable element. In the present embodiment, the other end of inductor 400 is coupled to the center conductor of coaxial line 230. Each coaxial line is coupled to a connector, as represented in FIG. 3, for connection to the appropriate transmitter or receiver line.

The antennas hereof can be modelled as a magnetic ring source above a ground plane. Since the diameter of the ring is always smaller than one wavelength in the borehole medium, then outside the source, a vertical electric dipole of strength p can be substituted for the ring. If the voltage on the button is v, then $p=2\epsilon^* vA$, where $\epsilon^*$ is the complex dielectric constant of the formation, and A is the effective area of the antenna. The factor of 2 occurs because the ground plane adds a dipole image in phase with the source dipole. In this case, the electric field at the pad surface at a receiving antenna due to the (transmitting) antenna can be expressed as $$E_z = \frac{pk^{*2}}{4\pi\epsilon^* r} e^{jk^* r} \left[ 1 + \frac{j}{k^* r} - \frac{1}{k^{*2} r^2} \right] \quad (1)$$

where $k^*$ is the formation complex propagation constant and r is the distance between two antennas. The received signal at the coaxial line, V will be proportional to $E_Z$. The ratio of the near receiver signal to the far receiver signal is $$\frac{V_{near}}{V_{far}} = \frac{r_{far}}{r_{near}} e^{jk^*(r_{near}-r_{far})} \frac{\left[ 1 + \frac{j}{k^* r_{near}} - \frac{1}{k^{*2} r_{near}^2} \right]}{\left[ 1 + \frac{j}{k^* r_{far}} - \frac{1}{k^{*2} r_{far}^2} \right]} \quad (2)$$

This can be expressed in terms of $k^*$, as $$k^* = \left( \frac{-j}{r_{near} - r_{far}} \right) \left\{ j\phi + \frac{G}{20} \ln 10 + \ln \left( \frac{r_{near}}{r_{far}} \right) + \ln \left( \frac{\left[ 1 + \frac{j}{k^* r_{near}} - \frac{1}{k^{*2} r_{near}^2} \right]}{\left[ 1 + \frac{j}{k^* r_{far}} - \frac{1}{k^{*2} r_{far}^2} \right]} \right) \right\} \quad (3)$$

where the ratio $V_{near}/V_{far}$ has been put in the form $$V_{near}/V_{far} = 10^{G/20} e^{j\theta}$$

where G is magnitude of the signal ratio in db, and $\theta$ is the phase of the signal ratio in radians. After obtaining G and $\theta$ (e.g. using the type of circuitry shown in FIG. 1), $k^*$ can be determined using relationship (3). In particular, since typically $|k^* r_{near}|$ or $|k^* r_{far}|$ is $>>1$, the natural log of the last bracketed term of relationship (3) is close to zero, $k^*$ can be solved for, as a first approximation, without such term. The $k^*$ obtained in this way can then be used on the righthand side of the complete expression (3) to obtain a better value of $k^*$, and the procedure will converge quickly to a solution value of $k^*$. The dielectric constant $\epsilon'$ and conductivity $\sigma$ can then be obtained using $$\epsilon' = \frac{k'^2 - k''^2}{k_o} \quad (4)$$

$$\sigma = \frac{2k'k''}{k_o^2} [\omega\epsilon_o] \quad (5)$$

where $k'$ and $k''$ are respectively the real and imaginary parts of $k^*$, $k_o$ is the free space propagation, and $\omega$ the angular frequency of operation. Alternatives to the iterative numerical solution set forth would be a table look-up technique or a curve matching technique, both well known in the art. A further possible approach is to provide a special purpose analog or digital processor which provides output functions that represent the relationships set forth. It will also be recognized that by using the described logging device in a suitably large test pit borehole, stored values can be obtained empirically.

The invention has been described with reference to particular preferred embodiments, but variations within the spirit and scope of the invention will occur to those skilled in the art. For example, while two receivers and two transmitters are shown in an illustrated embodiment, it will be understood that three or more receivers and/or one or more transmitters could be employed. Also, the operating frequency could be varied, uphole or downhole, and before or during a logging run.

I claim:

1. Apparatus for investigating formations surrounding a borehole, comprising:
   a logging device moveable through the borehole;
   a member mounted on the logging device for engagement with the borehole wall;
   a transmitting antenna mounted in the wall-engaging face of said member;
   a pair of spaced receiving antennas mounted in the wall-engaging face of said member in spaced relation to said transmitting antenna;
   each of said antennas comprising: a conductive base having a generally cylindrical recess therein which opens toward the borehole wall, a conductive rod coaxial with said recess and extending into said recess, a conductive button within said recess, mounted at the end of said rod, a dielectric material substantially filling the remainder of said recess, and a tuning element separate from said recess, said tuning element being coupled to said rod;
   means for energizing said transmitting antenna to transmit electromagnetic energy into said formations by applying a signal to said tuning element with respect to said base; and
   means for generating an output at each of said receiving antennas representative of electromagnetic energy received from the formations by obtaining a signal across said tuning element with respect to said base.

2. Apparatus as defined by claim 1, wherein said tuning element is an inductive tuning element.

3. Apparatus as defined by claim 1, further comprising sealing means separating said tuning element from said recess.

4. Apparatus as defined by claim 2, further comprising sealing means separating said tuning element from said recess.

5. Apparatus as defined by claim 1, wherein the average of the circumferences of the recess and the button is less than a wavelength at the operating frequency in the dielectric material of said recess, and wherein the depth of said recess is less than a quarter wavelength at the operating frequency in the dielectric material of said recess.

6. Apparatus as defined by claim 2, wherein the average of the circumferences of the recess and the button is less than a wavelength at the operating frequency in the dielectric material in said recess, and wherein the depth of said recess is less than a quarter wavelength at the operating frequency in the dielectric material of said recess.

7. Apparatus as defined by claim 4, wherein the average of the circumferences of the recess and the button is less than a wavelength at the operating frequency in the dielectric material in said recess, and wherein the depth of said recess is less than a quarter wavelength at the operating frequency in the dielectric material of said recess.

8. Apparatus as defined by claim 1, further comprising means responsive to the outputs of said receiving antennas to obtain the relative amplitude and phase of the outputs of said receiving antennas, and means for determining the dielectric constant of said formations as a function of said amplitude and phase.

9. Apparatus as defined by claim 2, further comprising means responsive to the outputs of said receiving antennas to obtain the relative amplitude and phase of the outputs of said receiving antennas, and means for determining the dielectric constant of said formations as a function of said amplitude and phase.

10. Apparatus as defined by claim 4, further comprising means responsive to the outputs of said receiving antennas to obtain the relative amplitude and phase of the outputs of said receiving antennas, and means for determining the dielectric constant of said formations as a function of said amplitude and phase.

11. Apparatus as defined by claim 5, further comprising means responsive to the outputs of said receiving antennas to obtain the relative amplitude and phase of the outputs of said receiving antennas, and means for determining the dielectric constant of said formations as a function of said amplitude and phase.

12. Apparatus as defined by claim 7, further comprising means responsive to the outputs of said receiving antennas to obtain the relative amplitude and phase of the outputs of said receiving antennas, and means for determining the dielectric constant of said formations as a function of said amplitude and phase.

13. Apparatus for investigating formations surrounding a borehole, comprising:
   a logging device moveable through the borehole;
   a member mounted on the logging device for engagement with the borehole wall;
   a transmitting antenna mounted in the wall-engaging face of said member;
   a pair of spaced receiving antennas mounted in the wall-engaging face of said member in spaced relation to said transmitting antenna;
   each of said antennas comprising: a conductive base having a generally cylindrical recess therein which opens toward the borehole wall, a conductive rod coaxial with said recess and extending into said recess, and a conductive button within said recess, mounted at the end of said rod, a dielectric material substantially filling the remainder of said recess;
   means for energizing said transmitting antenna to transmit electromagnetic energy into said formations by applying a signal to said rod with respect to said base; and
   means for generating an output signal at each of said receiving antennas representative of electromagnetic energy received from the formations by obtaining a signal across said rod with respect to said base;
   the average of the circumferences of the recess and the button being less than a wavelength at the operating frequency in the dielectric material of said recess, and the depth of said recess being less than a quarter wavelength at the operating frequency in the dielectric material of said recess.

* * * * *